United States Patent
Wei et al.

(10) Patent No.: US 12,499,219 B2
(45) Date of Patent: Dec. 16, 2025

(54) SECURITY PROTECTION METHOD FOR HETEROGENEOUS SYSTEM THAT IS CAPABLE OF RECONSTRUCTING MAPPING OF PUF CIRCUIT, NON-VOLATILE COMPUTER-READABLE STORAGE MEDIUM, ELECTRONIC DEVICE, AND PROCESSOR

(71) Applicants: Beijing BOE Technology Development Co., Ltd., Beijing (CN); BOE Technology Group Co., Ltd., Beijing (CN)

(72) Inventors: Xiangye Wei, Beijing (CN); Liming Xiu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 301 days.

(21) Appl. No.: 18/034,051

(22) PCT Filed: Nov. 20, 2020

(86) PCT No.: PCT/CN2020/130574
§ 371 (c)(1),
(2) Date: Apr. 26, 2023

(87) PCT Pub. No.: WO2022/104731
PCT Pub. Date: May 27, 2022

(65) Prior Publication Data
US 2023/0394137 A1 Dec. 7, 2023

(51) Int. Cl.
*G06F 21/55* (2013.01)
(52) U.S. Cl.
CPC ...... *G06F 21/552* (2013.01); *G06F 2221/034* (2013.01)

(58) Field of Classification Search
CPC .................. G06F 21/552; G06F 2221/034
See application file for complete search history.

(56) References Cited

U.S. PATENT DOCUMENTS

| 8,981,810 B1 | 3/2015 | Trimberger et al. |
| 9,621,173 B1 * | 4/2017 | Xiu ............... H03K 19/1737 |

(Continued)

FOREIGN PATENT DOCUMENTS

| CN | 102521538 A | 6/2012 |
| CN | 103198268 A | 7/2013 |

(Continued)

OTHER PUBLICATIONS

Machine translation of Foreign Patent Document (Year: 2020).*

(Continued)

*Primary Examiner* — Jeffrey C Pwu
*Assistant Examiner* — Edgar W Xie
(74) *Attorney, Agent, or Firm* — IPro, PLLC

(57) ABSTRACT

Provided is a security protection method for a heterogeneous system, wherein the heterogeneous system includes a processor. The processor includes a first region, wherein the first region includes a physical unclonable function circuit. The method includes: detecting whether an input of the heterogeneous system is abnormal; acquiring a configuration file in response to the input of the heterogeneous system being detected as abnormal, wherein the acquired configuration file is different from a configuration file of the physical unclonable function circuit that has run; and reconstructing, on the processor, a mapping of the physical unclonable function circuit based on the acquired configuration file.

14 Claims, 5 Drawing Sheets

(56) References Cited

U.S. PATENT DOCUMENTS

| | | | |
|---|---|---|---|
| 2014/0266296 A1 | 9/2014 | Wang et al. | |
| 2016/0080158 A1 | 3/2016 | Gehrer | |
| 2017/0111180 A1 | 4/2017 | Mathew et al. | |
| 2018/0351754 A1* | 12/2018 | Wallrabenstein | ..... H04L 9/3278 |
| 2019/0044739 A1 | 2/2019 | Sachdev et al. | |
| 2019/0305927 A1* | 10/2019 | Bhunia | ................... G06F 21/76 |
| 2020/0210628 A1* | 7/2020 | Karpinskyy | .......... H04L 9/0866 |
| 2022/0358203 A1* | 11/2022 | Qureshi | ................ H04L 9/3278 |

FOREIGN PATENT DOCUMENTS

| | | | |
|---|---|---|---|
| CN | 104168264 A | | 11/2014 |
| CN | 105978694 A | | 9/2016 |
| CN | 111291523 A | * | 6/2020 |
| CN | 111355589 A | | 6/2020 |
| WO | 2019055769 A1 | | 3/2019 |

OTHER PUBLICATIONS

CN202080002890.3 first office action.
Yuan Tian, "The Research and Design of Frequency Synthesizer Based on Method of Time-Average-Frequency." A theis for master's degree. Xidian University. Jun. 15, 2018 (Sections 2.2, 3.2).
Xiang, Qun-Liang, Pei-Yong Zhang, and Chen-Hui Feng. "Multiple frequency slots based physical unclonable functions." Journal of Electronics and Information Technology, 34.8 (2012): 2007-2012.
R hrmair, Ulrich, et al. "Modeling attacks on physical unclonable functions." Proceedings of the 17th ACM conference on Computer and communications security. 2010.
PCT/CN2020/130574 international search report and written opinion.

* cited by examiner

SECURITY PROTECTION METHOD FOR HETEROGENEOUS SYSTEM THAT IS CAPABLE OF RECONSTRUCTING MAPPING OF PUF CIRCUIT, NON-VOLATILE COMPUTER-READABLE STORAGE MEDIUM, ELECTRONIC DEVICE, AND PROCESSOR

CROSS-REFERENCE TO RELATED APPLICATION

The present disclosure is a U.S. national stage of international application No. PCT/CN2020/130574, filed on Nov. 20, 2020, the content of which is herein incorporated by reference in its entirety.

TECHNICAL FIELD

The present disclosure relates to the technical field of information security, and in particular, relates to a security protection method for a heterogeneous system, a non-volatile computer-readable storage medium, an electronic device, and a processor.

BACKGROUND OF THE INVENTION

With developments of 5G and the Internet of things (IoT), information has exploded exponentially, and the number of IoT terminal devices has also increased accordingly. More and more devices are connected to the network, giving unauthorized users more entrances to attack the network system. In the IoT era, hardware security is the foundation of network security. Each device in the IoT has the function of generating data, processing data, and transmitting data, which causes a great challenge to security.

SUMMARY OF THE INVENTION

According to some embodiments of the present disclosure, a security protection method for a heterogeneous system is provided. The heterogeneous system includes a processor, wherein the processor includes a first region, the first region including a physical unclonable function circuit. The method includes:
  detecting whether an input of the heterogeneous system is abnormal;
  acquiring a configuration file in response to the input of the heterogeneous system being detected as abnormal, wherein the acquired configuration file is different from a configuration file of the physical unclonable function circuit that has run; and
  reconstructing, on the processor, a mapping of the physical unclonable function circuit based on the acquired configuration file.

According to some embodiments of the present disclosure, a non-volatile computer-readable storage medium is provided. The non-volatile computer-readable storage medium stores one or more security protection programs for a heterogeneous system, wherein the one or more security protection programs, when loaded and run by a processor, cause the processor to perform the security protection method for the heterogeneous system as described above.

According to some embodiments of the present disclosure, an electronic device is provided. The electronic device includes a memory, a processor, and one or more security protection programs for a heterogeneous system that are stored in the memory and runnable on the processor. The one or more security protection programs, when loaded and run by the processor, cause the processor to perform the security protection method for the heterogeneous system as described above.

According to some embodiments of the present disclosure, a processor is provided. The processor includes:
  a programmable logic portion, wherein the programmable logic portion includes a first region, the first region including a physical unclonable function circuit;
  a detector, configured to detect whether the processor is attacked; and
  an operating portion, configured to acquire a configuration file in response to the processor being attacked and reconstruct, on the programmable logic portion, a mapping of the physical unclonable function circuit based on the acquired configuration file, wherein the acquired configuration file is different from a configuration file of the physical unclonable function circuit that has run.

Additional aspects and advantages of the present disclosure will be partly described hereinafter and will become apparent from the following description, or the practice of the present disclosure.

DETAILED DESCRIPTION

Figure 1:
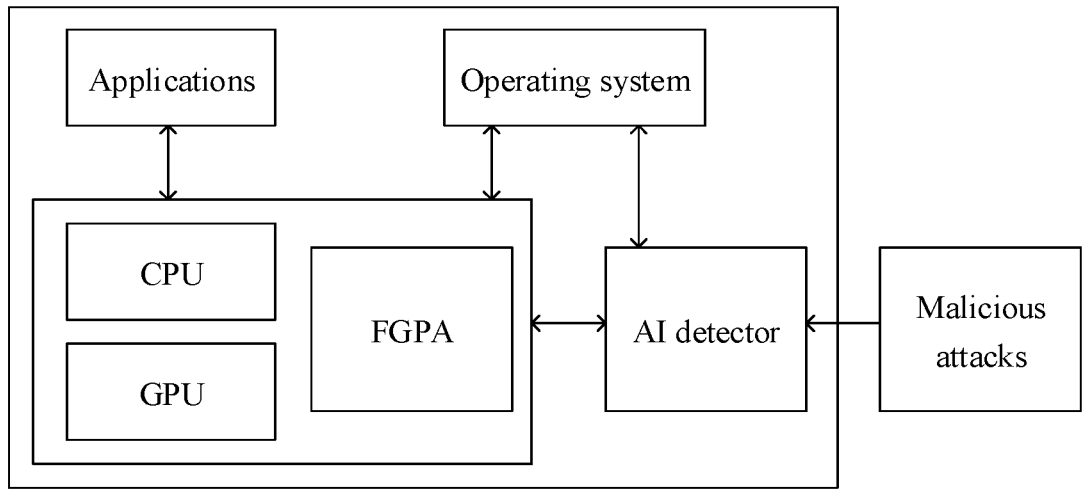
FIG. 1 is a schematic diagram of modules of a heterogeneous system according to some embodiments of the present disclosure.

For enhancement of security, a physical unclonable function (PUF) is developed. The PUF is a hardware function implementation circuit relying on chip features, has uniqueness and randomness, and achieves a function that a challenge signal and a response signal correspond to each other uniquely, by extracting deviation of process parameters that needs to be inevitably introduced in a chip manufacturing process. In traditional technologies, the unauthorized users model the PUF based on a used challenge response pair (CRP) and attack the system by the established model of the PUF, which leads to poor security of the system.

Embodiments of the present disclosure are described in further detail hereinafter, and examples of the embodiments are illustrated in the accompanying drawings. The same or similar reference numerals from beginning to end indicate the same or similar components or components having the same or similar functions. The embodiments described hereinafter with reference to the accompanying drawings are exemplary and are intended to explain the present disclosure instead of causing any limitation thereto.

A security protection method and apparatus for a heterogeneous system, and a processor according to some embodiments of the present disclosure are described hereinafter with reference to the accompanying drawings.

In the present disclosure, referring to FIG. 1, a heterogeneous system includes a processor, configured to run a physical unclonable function circuit. In some embodiments, the processor is a field programmable gate array (FPGA). In addition to the FPGA, the heterogeneous system further includes a central processing unit (CPU), a graphics processing unit (GPU), and a digital signal processor (DSP) to accommodate different scenarios under the Internet of everything. For example, algorithms of some of these devices or units iterate too far ahead than others and thus these devices are not suitable to be made as a dedicated chip, and the calculation is performed by the FPGA; and the format of some circuit data is uniform and highly repeatable, and the calculation is performed by the GPU. In general, the whole system is capable of meeting the demands of various calculations.

Figure 2:
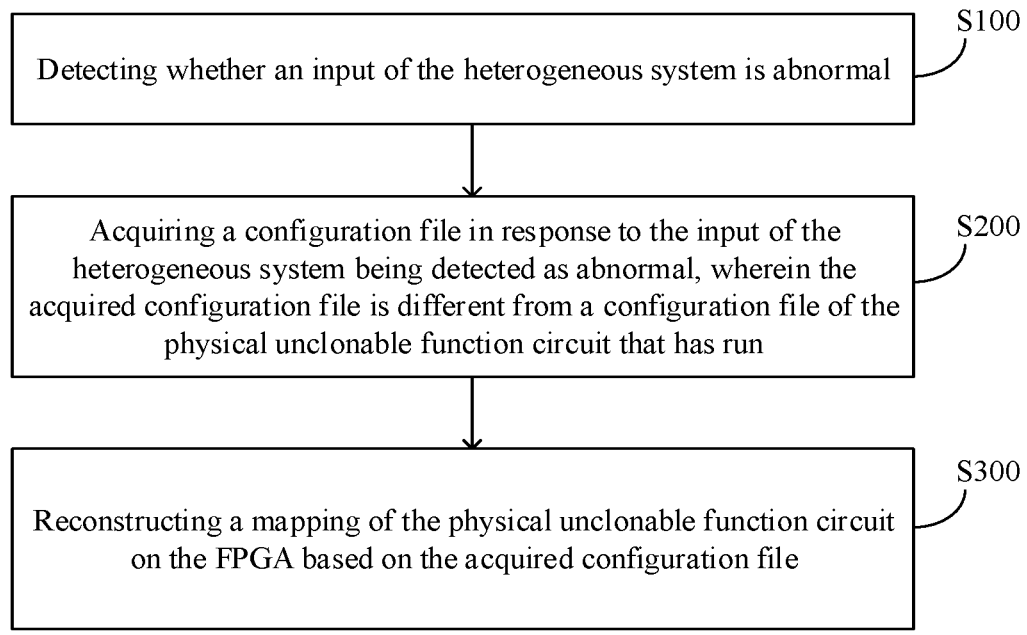
FIG. 2 is a flowchart of a security protection method for a heterogeneous system according to some embodiments of the present disclosure.

The FPGA includes a programmable logic (PL) portion and a program system (PS) portion. The PL portion includes a first region, wherein the first region includes the physical unclonable function circuit. As illustrated in FIG. 2, a security protection method for the heterogeneous system includes the following steps.

In step S100, whether an input of the heterogeneous system is abnormal is detected.

The heterogeneous system includes a detector, such as an Artificial Intelligence (AI) detector. The AI detector is configured to detect whether the input of the system is abnormal. In response to the system being powered on, the physical unclonable function circuit configured in the first region of the PL portion of the FPGA starts operating. Each time authentication or data encryption is completed by a CRP, the CRP is discarded after use, and the discarded CPR is recorded. In response to the system being powered on and operating, the AI detector detects in real-time whether there is any external attack on the system, for example, detecting whether a discarded CRP is employed to apply for authentication for multiple times, whether the heterogeneous system software detects any external access, whether abnormal jitter occurs to physical parameters of the heterogeneous system, for example, temperature and voltage, and the like. In the case that any of the above situations exist, it is determined that the input of the heterogeneous system is abnormal, that is, the heterogeneous system is under an external attack.

In step S200, a configuration file is acquired in response to the input of the heterogeneous system being detected as abnormal, wherein the acquired configuration file is different from a configuration file of the physical unclonable function circuit that has run.

The configuration file is employed to configure a device layout and wiring of the physical unclonable function circuit in the FPGA. In response to detecting that the input of the heterogeneous system is abnormal, the FPGA reconstructs the physical unclonable function circuit in the FPGA by erasing the physical unclonable function circuit that has run and reacquiring the configuration file, wherein the acquired configuration file is different from the configuration file of the physical unclonable function circuit that has run.

In some embodiments, acquiring the configuration file includes: acquiring a pre-stored configuration file, wherein the acquired pre-stored configuration file is different from the configuration file of the physical unclonable function circuit that has run. In the embodiments, a plurality of different configuration files are pre-stored in a storage module of the heterogeneous system, such that where the heterogeneous system is attacked, a new configuration file is acquired and the physical unclonable function circuit with a different layout is reconstructed based on the new configuration file.

In other embodiments, acquiring the configuration file includes: regenerating a configuration file, wherein the regenerated configuration file is different from the configuration file of the physical unclonable function circuit that has run. Specifically, in the case that the configuration files stored in the heterogeneous system are all attacked and unavailable, the system is capable of directly generating the configuration file and constructing the physical unclonable function circuit in the FPGA based on the regenerated configuration file. In this way, an attacker fails to perform a traversal attack on all the physical unclonable function circuits, such that the security of the heterogeneous system is improved.

In step S300, a mapping of the physical unclonable function circuit is reconstructed on the FPGA based on the acquired configuration file.

The mapping includes a relationship between a challenge and a response of the physical unclonable function circuit. The mapping is specifically expressed as the following formula.

$$f(c)=r$$

In the above formula, c, an abbreviation of challenge, represents a challenge, that is, an authentication code sent by a user or a requester; r is an abbreviation of response, that is, a response generated by a verifier based on the challenge; and f ( ) represents a mapping. Different physical unclonable functions have different process deviations and different mappings. The FPGA is capable of reconstructing the mapping of the physical unclonable function circuit by reading the configuration file and performing layout and connection on logic components in the selected region upon selecting a region based on the configuration file.

According to the above security protection method for the heterogeneous system, in the case that an external attack on the heterogeneous system is detected, the configuration file is reacquired. The acquired configuration file is different from the configuration file of the physical unclonable function that has run. The mapping of the physical unclonable function is reconstructed on the processor based on the acquired configuration file, and the mapping of the reconstructed physical unclonable function is different from the mapping of the original physical unclonable function. In this way, even though the same challenges are input into the two functions, responses generated by both are different, such that the attacker fails to model the reconstructed physical unclonable function circuit, and thus the security of the system is improved.

In some embodiments, reconstructing, on the processor, the mapping of the physical unclonable function circuit in a different layout based on the acquired configuration file includes: based on the acquired configuration file, compiling the physical unclonable function circuit and redesigning the compiled physical unclonable function circuit; and reconstructing the mapping of the physical unclonable function circuit by storing the result of the redesigned physical unclonable function circuit to the processor.

Specifically, in response to an external attack, the heterogeneous system reconstructs the mapping of the physical unclonable function circuit by erasing the original physical unclonable function circuit, compiling the physical unclonable function circuit based on the acquired configuration file, and redesigning the device. Redesigning the compiled physical unclonable function circuit refers to designing the layout and wiring method of the physical unclonable function circuit and storing the result of the redesigned physical unclonable function circuit to the processor, and causing the reconstructed physical unclonable function circuit to run on the processor. The layout and wiring structure of the logic elements in the reconstructed physical unclonable function circuit is different from the layout and wiring structure of the logic elements in the original physical unclonable function circuit, the deviations of the circuits are also different. Therefore, even though the same challenges are input into the two circuits, the generated responses are different, such that the external attacker fails to implement circuit modeling, and thus the security of the heterogeneous system is improved.

Further, in some embodiments, reconstructing the mapping of the physical unclonable function circuit by storing the result of the redesigned physical unclonable function circuit to the processor includes: reconstructing the mapping of the physical unclonable function circuit by storing the result of the redesigned physical unclonable function circuit to the first region of the processor or a second region, different from the first region, of the processor.

Specifically, according to the present disclosure, the reconstructed physical unclonable function circuit runs on the first region where the original physical unclonable function circuit runs, or on the second region which is different from the first region, and even on other regions, as long as the design of the reconstructed physical unclonable function circuit is different from the design of the original physical unclonable function circuit, that is, the layout and wiring methods are different.

Figure 3:
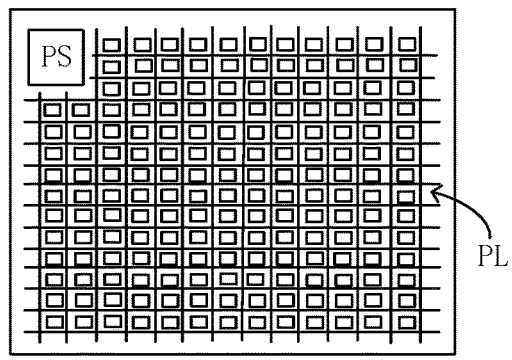
FIG. 3 is a schematic diagram of partitions of a processor according to some embodiments of the present disclosure.

As illustrated in FIG. 3, the FPGA includes the PS portion and the PL portion. The PS portion is configured to accomplish software algorithms or special control, and a real-time operating system is configured therein. The PL portion is configured for programmable logic, and different logic circuits or calculations are implemented on the PL portion. In the embodiments, both the first region and the second region are disposed on the PL portion. The physical unclonable function circuit is implemented in the FPGA with a small overhead. For example, the first region and the second region are arranged in the PL portion, and the physical unclonable function circuit is capable of running on the first region or the second region or other regions of the PL in a partially reconfigurable fashion. Moreover, the size of the physical unclonable function circuit is designed according to the actual needs. For relations between challenges of the physical unclonable function circuit and CRPs generated based on the challenges, reference is made to Table 1.

TABLE 1

| | | Simple CRP (F + SADR)/Ω | |
|---|---|---|---|
| n = log2K | | #of bits for challenge | #of CRPs |
| n | K | 2n + 1 | 2K2 − K |
| 3 | 8 | 7 | 120 |
| 4 | 16 | 9 | 496 |
| 5 | 32 | 11 | 2016 |
| 6 | 64 | 13 | 8128 |
| 7 | 128 | 15 | 32640 |

It should be understood that areas of both the first region and the second region are greater than an area of the physical unclonable function circuit for the purpose of storing the design of the reconstructed physical unclonable function circuit. In the embodiments, both the area of the first region and the area of the second region are designed to be not less than 1.5 times the area occupied by the physical unclonable function circuit, which provides a sufficient space margin for the reconstructed physical unclonable function.

According to the above security protection method for the heterogeneous system, the reconstruction is capable of being performed on the first region where the original physical unclonable function circuit runs, or on the second region different from the first region, or even on other regions, such that the processor is provided with infinite CRPs, and thus the external attacker fails to perform modelling or traversal attacks, which improves the security of the heterogeneous system. In addition, because the areas of both the first region and the second region are larger than the area occupied by the physical unclonable function circuit, an infinite variety of physical unclonable function circuits of different structures are configured on the first region or the second region. In this way, the reconstructions of physical unclonable function circuits of multiple structures are implemented with a small overhead, which reduces costs.

In some embodiments, the physical unclonable function circuit is a time-average-frequency direct period synthesis physical unclonable function (TAF-DPS-PUF) circuit. The TAF-DPS-PUF circuit constructs the mapping according to the following steps. Corresponding characteristic bit streams are generated by extracting first parameters by a first time-average-frequency direct period synthesizer (TAF-DPS) and a second TAF-DPS that are symmetrical; and the mapping is constructed according to delay features of the first TAF-DPS and the second TAF-DPS in outputting the characteristic bit streams.

Figure 4:
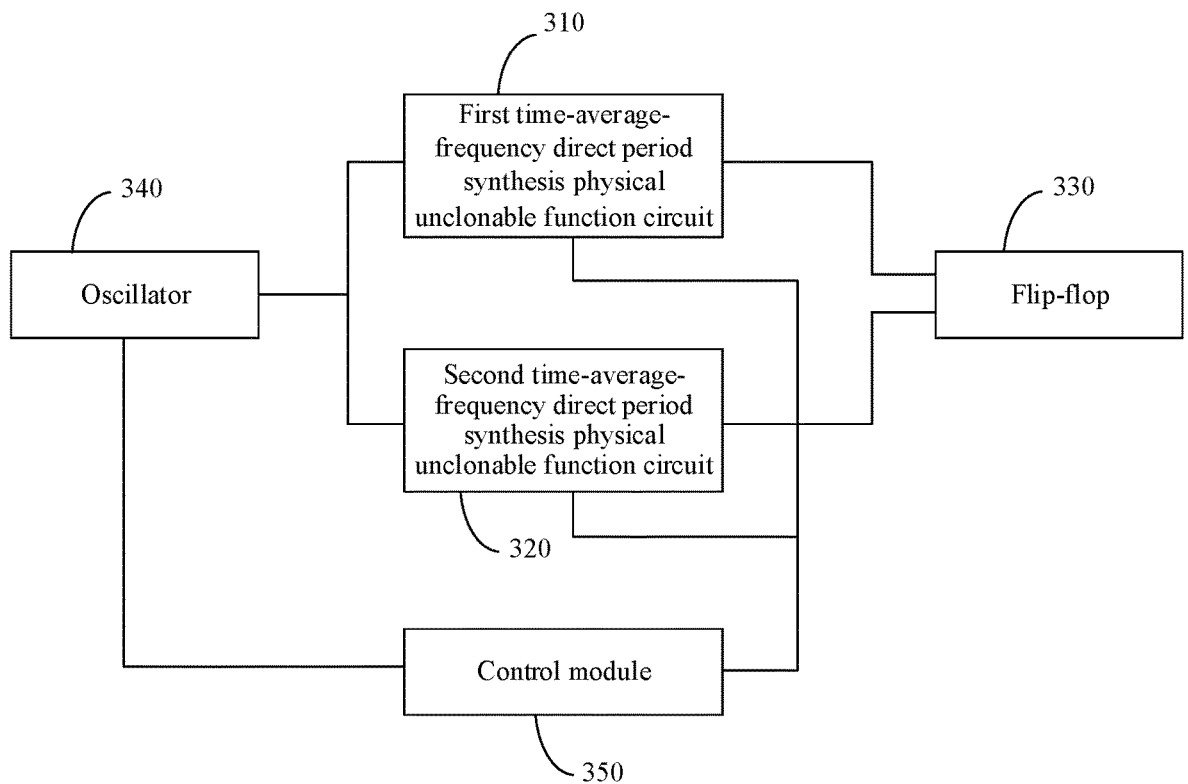
FIG. 4 is a schematic diagram of modules of a time-average-frequency direct period synthesis physical unclonable function circuit of a processor according to some embodiments of the present disclosure.

Specifically, referring to FIG. 4, the TAF-DPS-PUF circuit includes the first TAF-DPS 310, the second TAF-DPS 320, and a flip-flop 330. An optional implementation of the first TAF-DPS is described with reference to FIG. 5. The TAF-DPS receives a basic time unit Δ and a control word F=I+r. I represents an integer part, r represents a fractional part, F is typically entered by a user according to frequency needs, and the basic time unit Δ is typically designed according to the needs of circuit design. Two time periods TA and TB are output according to the TAF method.

$TA = I * \Delta$      Formula (1)

$Tb = (I+1) * \Delta$      Formula (2)

A clock signal, whose period is a target period, is acquired by synthesizing the two time periods using the period synthesis technique, and the target period $T_{TAF}$ satisfies the following formula.

$T_{TAF} = (1-r) * TA + r * TB$      Formula (3)

The following formulas acquired by substituting formula (1) and formula (2) into formula (3).

$$T_{TAF}=(1+r)*\Delta \quad \text{Formula (4)}$$

Based on formula (4), r controls the probability of occurrence of TB, that is, r controls a frequency of switchover between periods TA and TB.

A frequency $f_{TAF}$ of the clock signal output from the TAF-DPS is further calculated based on formula (4).

$$f_{TAF} = \frac{1}{T_{TAF}} = 1/(1+r)*\Delta \quad \text{Formula (5)}$$

Any frequency is capable of being generated by the TAF-DPS as long as the number of bits given r in the control word F is sufficient.

In the embodiments, the first TAF-DPS 310 and the second TAF-DPS 320 have the same type, number, and layout and wiring of logic units, and both form delay paths of the same structure. The TAF-DPS-PUF circuit further includes an oscillator 340 and a control module 350. The oscillator 340 is connected between the first TAF-DPS 310 and the second TAF-DPS 320. The control module 350 is connected to the oscillator 340, the first TAF-DPS 310, and the second TAF-DPS 320, and is configured to control the oscillator 340 to input the same initial pulse frequencies into the first TAF-DPS 310 and the second TAF-DPS 320. Meanwhile, the control module 330 is further configured to input the control words to the first TAF-DPS 310 and the second TAF-DPS 320. The same input signals (i.e., the challenges) are input into the symmetrical first TAF-DPS 310 and the second TAF-DPS 320. The first TAF-DPS 310 and the second TAF-DPS 320 are configured to extract the first parameters, that is, to extract the process deviations of the circuit, and to digitize the deviations into the characteristic bit streams. The flip-flop 330 outputs the responses by comparing delays of the characteristic bit streams output by the first TAF-DPS and the second TAF-DPS. That is, the mapping is constructed by the TAF-DPS-PUF circuit. Because the layouts of the physical unclonable function circuits before and after the reconstruction are different, the process deviations are different, the delays of the internal connections are different, and thus the mappings are different, such that the attacker fails to model the reconstructed physical unclonable function circuit, and thus the security of the heterogeneous system is improved.

Figure 6:
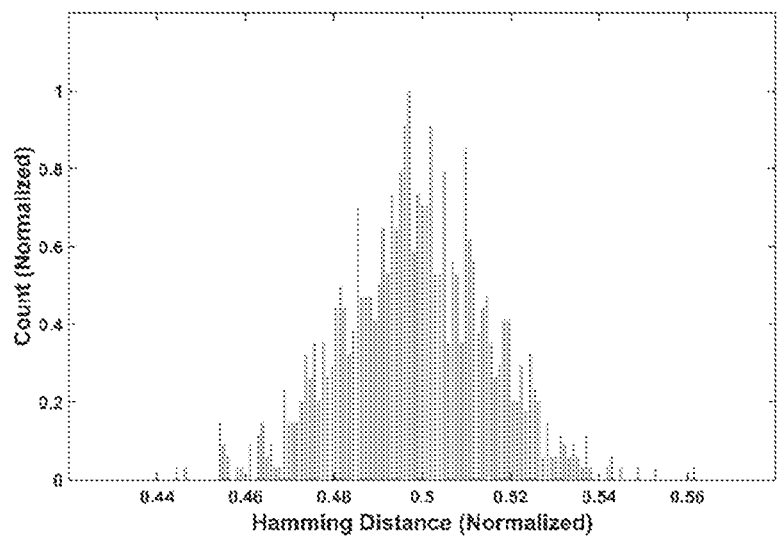
FIG. 6 is a Hamming distance statistics chart of a time-average-frequency direct period synthesis physical unclonable function circuit prior to reconstruction and a time-average-frequency direct period synthesis physical unclonable function circuit upon the reconstruction of a processor according to some embodiments of the present disclosure.

FIG. 6 is a Hamming distance statistics chart of a time-average-frequency direct period synthesis physical unclonable function circuit prior to reconstruction and a time-average-frequency direct period synthesis physical unclonable function circuit upon the reconstruction of a processor according to some embodiments of the present disclosure. The horizontal axis is the Hamming distance and the vertical axis is the counts of the response. The Hamming distance is calculated as the following formula.

$$HD_{RC} = \frac{\sum (FFB(F, SADR)_A^n \oplus (FFB(F, SADR)_B^n}{l}$$

Figure 5:
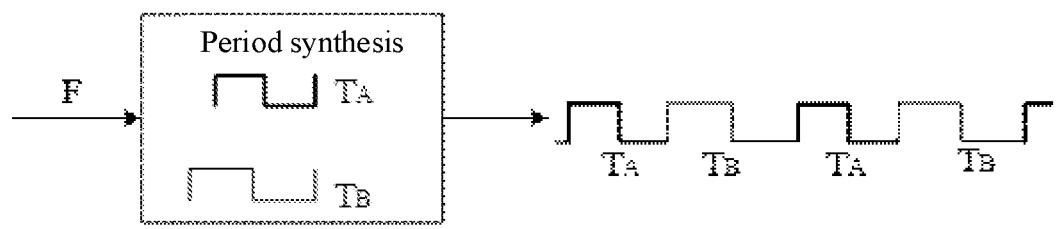
FIG. 5 is a schematic diagram of an operating principle of a time-average-frequency direct period synthesizer according to some embodiments of the present disclosure.

In the above formula, HDRC represents the Hamming distance of the responses that are generated by the TAF-DPS-PUF circuit upon the reconstruction and the TAF-DPS-PUF circuit prior to the reconstruction when the same challenge is input; (FFB(F, SADR)$_A^n$ represents the response of the TAF-DPS-PUF circuit prior to the reconstruction; (FFB(F, SADR)$_B^n$ represents the response of the TAF-DPS-PUF circuit upon the reconstruction; and l represents the bit length of the response. As illustrated in FIG. 5, the Hamming distance upon and prior to the reconstruction is greater than 50%, and thus the responses generated by the TAF-DPS-PUF circuits upon and prior to the reconstruction under the same challenge are completely different.

Figure 7:
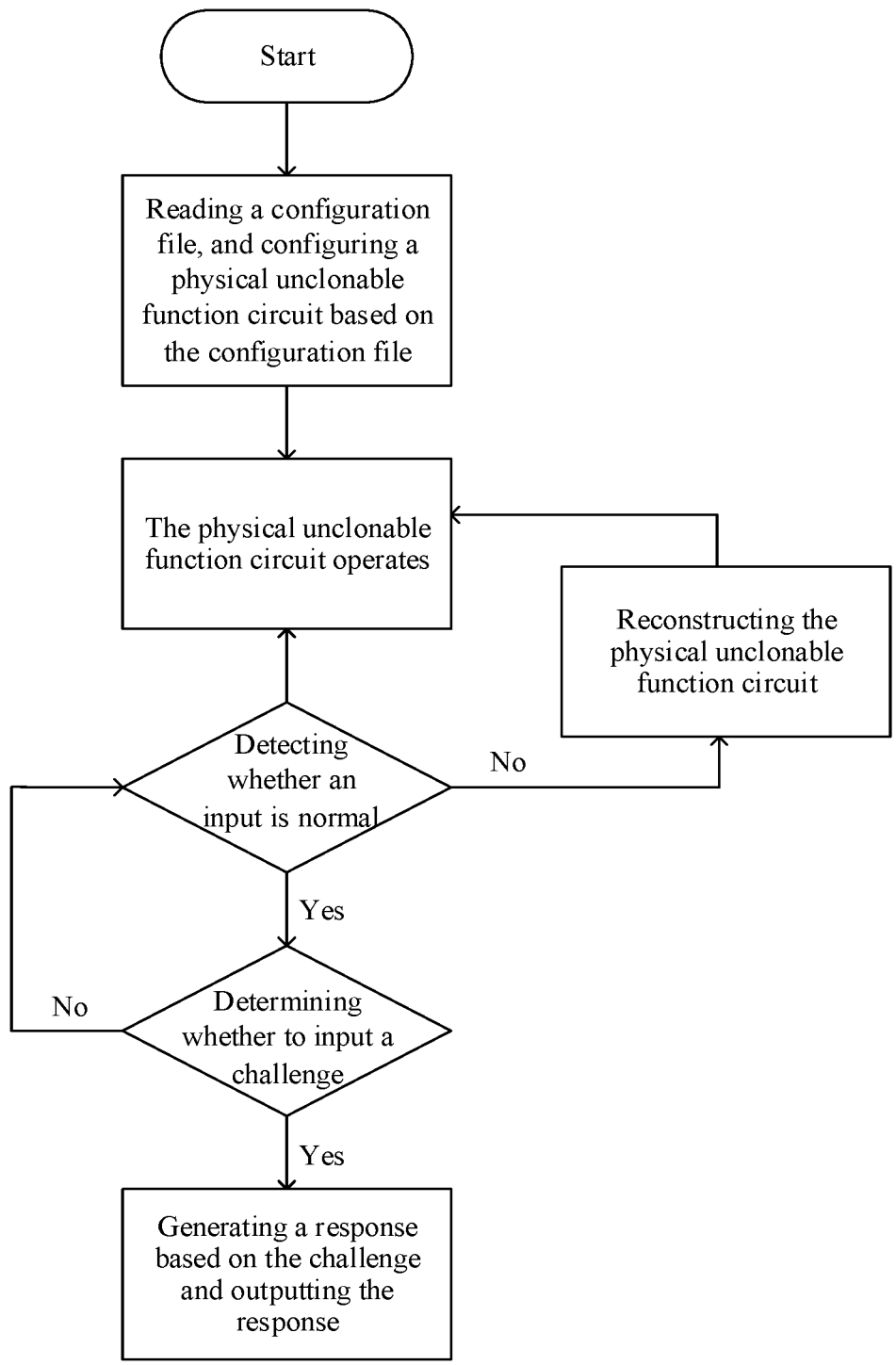
FIG. 7 is a flowchart of a security protection method for a heterogeneous system according to some specific embodiments of the present disclosure.

FIG. 7 is a flowchart of a security protection method for a heterogeneous system according to some specific embodiments of the present disclosure. As illustrated in FIG. 7, in response to the system being powered on, the FPGA reads the configuration file from a FLASH or other storage modules and configures the physical unclonable function circuit on the first region of the PL portion. The physical unclonable function circuit starts operating, and the system detects in real-time whether the external input is normal. In the case that the external input is normal, there is no external attack, then whether a challenge is input into the physical unclonable function circuit is determined. In the case that a challenge is input into the physical unclonable function circuit, the physical unclonable function circuit generates a response based on the challenge and outputs the response. In the case that the external input is detected as abnormal, a new configuration file is acquired, which is different from the configuration file of the physical unclonable function circuit that has run, and the physical unclonable function circuit is reconstructed in a different layout in the first region or the second region different from the first region based on the new configuration file. In this way, infinite virtual CRPs are provided for the whole system. The CRPs of one physical unclonable function circuit are finite, but performing the reconstruction on the physical unclonable function circuit when it is attacked is equivalent to performing a virtual extension on its CRPs. This method provides higher security for the heterogeneous system, had has the characteristics of low power consumption and low cost. This method can effectively respond to violent attacks from unauthorized users and improve the security and life cycle of the product. The dynamic heterogeneous security system of the TAF-DPS-PUF circuit achieves self-regulation and configuration when attacked, which achieves dynamic reconstruction of the hardware security primitives, and thus the security of the system is enhanced. This method increases the security level and effectively extends the life cycle of the product.

Figure 8:
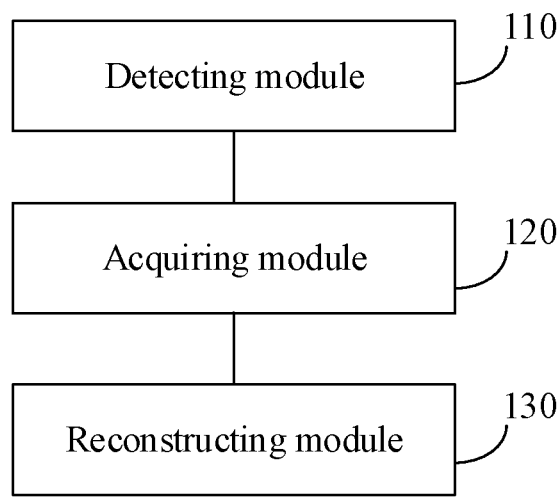
FIG. 8 is a schematic diagram of modules of a security protection apparatus for a heterogeneous system according to some embodiments of the present disclosure.

As illustrated in FIG. 8, some embodiments of the present disclosure provide a security protection apparatus for a heterogeneous system. The heterogeneous system includes a processor. The processor includes a first region, wherein a physical unclonable function circuit runs on the first region. The security protection apparatus includes a detecting module 110, an acquiring module 120, and a reconstructing module 130. The detecting module 110 is configured to detect whether an input of the heterogeneous system is abnormal. The acquiring module 120 is configured to acquire a configuration file in response to the input of the heterogeneous system being abnormal, wherein the acquired configuration file is different from a configuration file of the physical unclonable function circuit that has run. The reconstructing module 130 is configured to reconstruct, on the processor, a mapping of the physical unclonable function circuit based on the acquired configuration file.

It should be noted that, for the description of the security protection apparatus for the heterogeneous system in the present disclosure, reference is made to the description of the security protection method for the heterogeneous system in the present disclosure, which is not repeated herein.

The security protection apparatus for the heterogeneous system as described above, by the security protection method described above, reacquires the configuration file in response to detecting an external attack on the heterogeneous system and reconstructs, on the processor, the mapping of the physical unclonable function based on the acquired configuration file. Because the mapping of the reconstructed physical unclonable function is different from the mapping of the original physical unclonable function, even though the same challenges are input into the two physical unclonable functions, the responses generated by both are different. In this way, the attacker fails to model the reconstructed physical unclonable function circuit, and thus the security of the system is improved.

Figure 9:
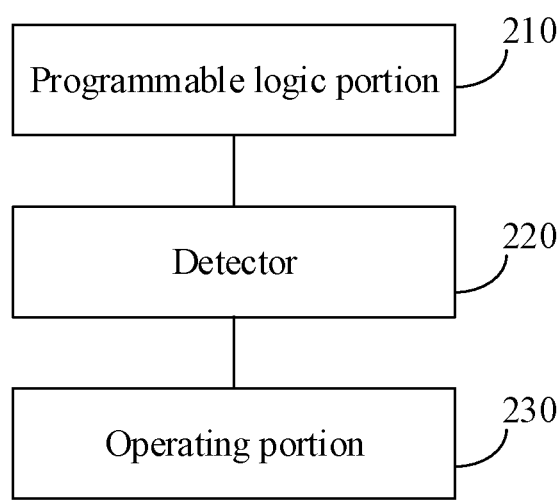
FIG. 9 is a schematic diagram of modules of a processor according to some embodiments of the present disclosure.

Further, as illustrated in FIG. 9, some embodiments of the present disclosure provide a processor. The processor includes a programmable logic portion 210, a detector 220, and an operating portion 230. In the embodiments, the processor is an FPGA. The programmable logic portion 210 includes a first region, wherein a physical unclonable function circuit runs in the first region. The detector 220 is configured to detect whether the FPGA is attacked. The operating portion 230 is configured to acquire a configuration file in response to the FPGA being attacked and reconstruct, on the programmable logic portion 210, a mapping of the physical unclonable function circuit based on the acquired configuration file, wherein the acquired configuration file is different from a configuration file of the physical unclonable function circuit that has run.

In the processor according to the above embodiments, in response to the detector 220 detecting an external attack, the operating portion 230 reacquires the configuration file and reconstructs, on the programmable logic portion 210, the mapping of the physical unclonable function based on the acquired configuration file. Because the mapping of the reconstructed physical unclonable function is different from the mapping of the original physical unclonable function, even though the same challenges are input into the two physical unclonable functions, the responses generated by both are different. In this way, an external attacker fails to model the reconstructed physical unclonable function circuit, such that the external attacker is prevented from attacking the processor, and thus the security of the system is improved.

In some embodiments, the operating portion 230 is further configured to reconstruct the mapping of the physical unclonable function circuit, by compiling the physical unclonable function circuit based on the acquired configuration file, redesigning the compiled physical unclonable function circuit, and storing the result of the redesigned physical unclonable function circuit to the programmable logic portion.

In other embodiments, the operating portion 230 is configured to reconstruct the physical unclonable function circuit by storing the result of the redesigned physical unclonable function circuit to the first region or a second region different from the first region of the programmable logic portion. It should be understood that logic circuits with other functions simultaneously run on the programmable logic portion 210 in addition to the physical unclonable function circuit.

It should be understood that to store the physical unclonable function circuit, areas of both the first region and the second region are larger than an area of the physical unclonable function circuit. In the embodiments, each of the areas of both the first region and the second region is not less than 1.5 times the area occupied by the physical unclonable function circuit, such that the first region or the second region is capable of providing sufficient space margin for the reconstruction of the physical unclonable function circuit.

In the processor according to the above embodiments, both the physical unclonable function circuit and the logic circuit with other functions run on the programmable logic portion, wherein the physical unclonable function circuit runs on the first region or the second region, and each of the areas of both the first region and the second region is not less than the area occupied by the physical unclonable function circuit. In this way, an infinite variety of physical unclonable function circuits of different structures are configured on the first region or the second region, such that the reconstruction of the physical unclonable function circuits of multiple structures is implemented with a small overhead, and thus the costs are reduced.

In some embodiments, the physical unclonable function circuit is a TAF-DPS-PUF circuit. The structure of the TAF-DPS-PUF circuit is illustrated in FIG. 4. For the operating principle of the TAF-DPS-PUF circuit, reference is made to the description in the previous paragraph, which is not repeated herein.

In some embodiments, the acquired configuration file is a pre-stored configuration file, and the pre-stored configuration file is different from the configuration file of the physical unclonable function circuit that has run. It should be understood that the processor further includes a storage unit configured to store the configuration file.

In other embodiments, the acquired configuration file is a regenerated configuration file, and the regenerated configuration file is different from the configuration file of the physical unclonable function circuit that has run. The processor is also capable of directly generating a new configuration file in the case that all of the pre-stored configuration files are attacked and become unavailable, such that the attacker fails to perform a traversal attack.

In the processor described above, in response to detecting an external attack, the operating portion reacquires the configuration file and reconstructs, on the programmable logic portion, the physical unclonable function in a different layout based on the acquired configuration file. In this way, an external attacker fails to model the reconstructed physical unclonable function circuit, such that it is capable of defending against attacks on the processor from the external attacker, and thus the security of the system is improved.

In addition, some embodiments of the present disclosure further provide a computer-readable storage medium, on which one or more security protection programs for a heterogeneous system are stored. The one or more security protection programs, when loaded and run by a processor, cause the processor to perform the security protection method for the heterogeneous system as described above. For the description of the operation of the one or more security protection programs for the heterogeneous system in the present disclosure, reference is made to the description of the security protection method for the heterogeneous system in the present disclosure, which is not repeated herein.

The computer-readable storage medium described above, by the security protection method for the heterogeneous system described above, reconstructs the physical unclonable function circuit in a different layout in response to detecting an external attack on the heterogeneous system. In this way, the attacker fails to model the reconstructed physical unclonable function circuit, such that the security of the system is improved.

In addition, some embodiments of the present disclosure further provide an electronic device. The electronic device includes a memory, a processor, and one or more security protection programs for a heterogeneous system that are stored in the memory and runnable on the processor. The one or more security protection programs, when loaded and run by the processor, cause the processor to perform the security protection method for the heterogeneous system as described above, which is not repeated herein.

The electronic device according to some embodiments of the present disclosure, by the security protection method for the heterogeneous system described above, reconstructs the physical unclonable function circuit in a different layout in response to detecting an external attack on the heterogeneous system. In this way, the attacker fails to model the reconstructed physical unclonable function circuit, such that the security of the system is improved.

In the security protection method for the heterogeneous system according to the embodiments of the present disclosure, in the case that an external attack on the heterogeneous system is detected, the configuration file is reacquired. The acquired configuration file is different from the configuration file of the physical unclonable function that has run. The mapping of the physical unclonable function is reconstructed on the processor based on the acquired configuration file, and the mapping of the reconstructed physical unclonable function is different from the mapping of the original physical unclonable function. In this way, even though the same challenges are input into the two functions, responses generated by both are different, such that the attacker fails to model the reconstructed physical unclonable function circuit, and thus the security of the system is improved.

The non-volatile computer-readable storage medium according to the embodiments of the present disclosure, by the security protection method for the heterogeneous system as described above, reconstructs the physical unclonable function in response to detecting an external attack on the heterogeneous system. In this way, the attacker fails to model the reconstructed physical unclonable function circuit, and thus the security of the system is improved.

The electronic device according to the embodiments of the present disclosure, by the security protection method for the heterogeneous system as described above, reconstructs the physical unclonable function in response to detecting an external attack on the heterogeneous system. In this way, the attacker fails to model the reconstructed physical unclonable function circuit, and thus the security of the system is improved.

The security protection apparatus for the heterogeneous system according to the embodiments of the present disclosure reconstructs the physical unclonable function in response to detecting an external attack on the heterogeneous system. In this way, the attacker fails to model the reconstructed physical unclonable function circuit, and thus the security of the system is improved.

The processor according to the embodiments of the present disclosure reconstructs the physical unclonable function in response to detecting an external attack on the heterogeneous system. In this way, the attacker fails to model the reconstructed physical unclonable function circuit, and thus the security of the system is improved.

It should be noted that the logic and/or steps represented in the flowchart or otherwise described herein, such as an ordered list of executable instructions considered to be configured to implement a logical function, may be specifically implemented in any computer-readable medium, for use by an instruction execution system, device, or apparatus (e.g., a computer-based system, a system including a processor, or other systems that may acquire instructions from an instruction execution system, device, or apparatus and execute the instructions), or for use in combination with such instruction execution systems, devices or apparatus. For purposes of this specification, the term "computer-readable medium" may be any apparatus that can contain, store, communicate, transmit, or transfer one or more programs of use by an instruction execution system, device, or apparatus, or for use in conjunction with such instruction execution system, device, or apparatus. More specific examples of the computer-readable medium (a non-exhaustive list) include the following: an electrically connected portion with one or more wirings (an electronic device), a portable computer disk enclosure (a magnetic device), a random-access memory (RAM), a read-only memory (ROM), an erasable editable read-only memory (EPROM or flash memory), a fiber-optic device, and a portable compact disc read-only memory (CD-ROM). Alternatively, the computer-readable medium may even be a paper or other suitable medium on which the program can be printed. Because the program can be acquired in an electronic manner, for example, by optical scanning the paper or other medium, followed by editing, decoding, or, if necessary, processing in other suitable ways, and then the acquired program is stored in the computer memory.

It should be understood that various portions of the present disclosure may be implemented with hardware, software, firmware, or a combination thereof. In the above embodiments, a plurality of steps or methods may be implemented by software or firmware stored in the memory and executed by a suitable instruction execution system. For example, in the case that the steps or methods are implemented in hardware, as in other embodiments, any of the following techniques or combinations thereof known in the art can be used for the implementation: a discrete logic circuit with logic gates configured to implement logic functions on data signals, a specialized integrated circuit with suitable combinational logic gates, a programmable gate array (PGA), and a field programmable gate array (FPGA).

In the description of this specification, the terms "an embodiment," "some embodiments," "an example," "a specific example," "some examples," or the like mean that the specific features, structures, materials, or characteristics described in connection with the embodiment or example are included in at least one embodiment or example of the present disclosure. In this specification, the illustrative representation of the above terms does not necessarily refer to the same embodiment or example. Further, the specific features, structures, materials, or characteristics described may be combined in any one or more embodiments or examples in a suitable manner.

In addition, the terms "first" and "second" are only used for descriptive purposes, and cannot be understood as indicating or implying relative importance, or implicitly specifying the number of indicated technical features. Thus, features qualified with "first" and "second" may explicitly or implicitly include at least one such feature. In the description of the present disclosure, the term "a plurality of" refers to two or more, such as two or three, unless expressly defined otherwise.

In the present disclosure, unless otherwise defined and limited, the terms "mount," "connect," "contact," "fix," and the like should be broadly understood, such as fixed connections, detachable connections, or integration; mechanical connections or electrical connections; direct connections, or indirect connections through an intermediate medium; or internal communications within two components or interaction between two components. For those skilled in the art, the specific meanings of the above terms in the present disclosure can be understood according to the specific circumstances.

Although the embodiments of the present disclosure have been illustrated and described above, it should be understood that the embodiments described above are merely exemplary embodiments of the present disclosure, and are not intended to limit the present disclosure. Therefore, any modifications, equivalent substitutions, improvements, and the like may be made by those skilled in the art within the scope of the present disclosure.

The invention claimed is:

1. A security protection method for a heterogeneous system, wherein
the heterogeneous system comprises a processor, wherein the processor comprises a first region, the first region comprising a physical unclonable function circuit; and
the method comprises:
detecting whether an input of the heterogeneous system is abnormal;
acquiring a configuration file in response to the input of the heterogeneous system being detected as abnormal, wherein the acquired configuration file is different from a configuration file of the physical unclonable function circuit that has run; and
reconstructing, on the processor, a mapping of the physical unclonable function circuit based on the acquired configuration file;
wherein the physical unclonable function circuit is a time-average-frequency direct period synthesis physical unclonable function circuit; and
the mapping is constructed by the time-average-frequency direct period synthesis physical unclonable function circuit according to following steps:
generating corresponding characteristic bit streams by extracting first parameters by a first time-average-frequency direct period synthesizer and a second time-average-frequency direct period synthesizer that are symmetrical, wherein the first parameters indicate process deviations of the circuit; and
constructing the mapping by outputting responses by comparing delay features of the characteristic bit streams output by the first time-average-frequency direct period synthesizer and the second time-average-frequency direct period synthesizer.

2. The security protection method according to claim 1, wherein reconstructing, on the processor, the mapping of the physical unclonable function circuit based on the acquired configuration file comprises:
based on the acquired configuration file, compiling the physical unclonable function circuit and redesigning the compiled physical unclonable function circuit; and
reconstructing the mapping of the physical unclonable function circuit by storing a result of the redesigned physical unclonable function circuit to the processor.

3. The security protection method according to claim 2, wherein reconstructing the mapping of the physical unclonable function circuit by storing the result of the redesigned physical unclonable function circuit to the processor comprises:
reconstructing the mapping of the physical unclonable function circuit by storing the result of the redesigned physical unclonable function circuit to the first region of the processor or a second region, different from the first region, of the processor.

4. The security protection method according to claim 1, wherein acquiring the configuration file in response to the input of the heterogeneous system being detected as abnormal comprises:
acquiring a pre-stored configuration file, wherein the acquired pre-stored configuration file is different from the configuration file of the physical unclonable function circuit that has run; or
regenerating a configuration file, wherein the regenerated configuration file is different from the configuration file of the physical unclonable function circuit that has run.

5. A non-volatile computer-readable storage medium, storing one or more security protection programs for a heterogeneous system, wherein the one or more security protection programs, when loaded and run by a processor, cause the processor to perform the security protection method for the heterogeneous system as defined in claim 1.

6. An electronic device, comprising: a memory, a processor, and one or more security protection programs for a heterogeneous system that are stored in the memory and runnable on the processor; wherein the one or more security protection programs, when loaded and run by the processor, cause the processor to perform a security protection method for the heterogeneous system, wherein
the heterogeneous system comprises a processor, wherein the processor comprises a first region, the first region comprising a physical unclonable function circuit; and
wherein the one or more security protection programs, when loaded and run by the processor, cause the processor to perform:
detecting whether an input of the heterogeneous system is abnormal;
acquiring a configuration file in response to the input of the heterogeneous system being detected as abnormal, wherein the acquired configuration file is different from a configuration file of the physical unclonable function circuit that has run; and
reconstructing, on the processor, a mapping of the physical unclonable function circuit based on the acquired configuration file;
wherein the physical unclonable function circuit is a time-average-frequency direct period synthesis physical unclonable function circuit; and
the mapping is constructed by the time-average-frequency direct period synthesis physical unclonable function circuit according to following steps:
generating corresponding characteristic bit streams by extracting first parameters by a first time-average-frequency direct period synthesizer and a second time-average-frequency direct period synthesizer that are symmetrical, wherein the first parameters indicate process deviations of the circuit; and
constructing the mapping by outputting responses by comparing delay features of the characteristic bit streams output by the first time-average-frequency direct period synthesizer and the second time-average-frequency direct period synthesizer.

7. A processor, comprising:
a programmable logic portion, wherein the programmable logic portion comprises a first region, the first region comprising a physical unclonable function circuit;

a detector, configured to detect whether the processor is attacked; and an operating portion, configured to acquire a configuration file in response to the processor being attacked and reconstruct, on the programmable logic portion, a mapping of the physical unclonable function circuit based on the acquired configuration file, wherein the acquired configuration file is different from a configuration file of the physical unclonable function circuit that has run;

wherein the physical unclonable function circuit is a time-average-frequency direct period synthesis physical unclonable function circuit; and the time-averaged-frequency direct period synthesis physical unclonable function circuit comprises:

a first time-average-frequency direct period synthesizer and a second time-average-frequency direct period synthesizer that are symmetrical, wherein the first time-average-frequency direct period synthesizer and the second time-average-frequency direct period synthesizer are configured to generate corresponding characteristic bit streams by extracting first parameters, wherein the first parameters indicate process deviations of the circuit; and a flip-flop, configured to construct the mapping by outputting responses by comparing delay features of the characteristic bit streams output by the first time-average-frequency direct period synthesizer and the second time-average-frequency direct period synthesizer.

8. The processor according to claim 7, wherein the operating portion is further configured to:

based on the acquired configuration file, compile the physical unclonable function circuit and redesign the compiled physical unclonable function circuit; and reconstruct the mapping of the physical unclonable function circuit by storing a result of the redesigned physical unclonable function circuit to the programmable logic portion.

9. The processor according to claim 8, wherein the operating portion is further configured to reconstruct the mapping of the physical unclonable function circuit by storing the result of the redesigned physical unclonable function circuit to the first region of the programmable logic portion or a second region, different from the first region, of the programmable logic portion.

10. The processor according to claim 7, wherein the acquired configuration file is a pre-stored configuration file, wherein the pre-stored configuration file is different from the configuration file of the physical unclonable function circuit that has run.

11. The processor according to claim 7, wherein the acquired configuration file is a regenerated configuration file, wherein the regenerated configuration file is different from the configuration file of the physical unclonable function circuit that has run.

12. The electronic device according to claim 6, wherein the one or more security protection programs, when loaded and run by the processor, cause the processor to perform:

based on the acquired configuration file, compiling the physical unclonable function circuit and redesigning the compiled physical unclonable function circuit; and reconstructing the mapping of the physical unclonable function circuit by storing a result of the redesigned physical unclonable function circuit to the processor.

13. The electronic device according to claim 12, wherein the one or more security protection programs, when loaded and run by the processor, cause the processor to perform:

reconstructing the mapping of the physical unclonable function circuit by storing the result of the redesigned physical unclonable function circuit to the first region of the processor or a second region, different from the first region, of the processor.

14. The electronic device according to claim 6, wherein the one or more security protection programs, when loaded and run by the processor, cause the processor to perform:

acquiring a pre-stored configuration file, wherein the acquired pre-stored configuration file is different from the configuration file of the physical unclonable function circuit that has run; or regenerating a configuration file, wherein the regenerated configuration file is different from the configuration file of the physical unclonable function circuit that has run.

\* \* \* \* \*